(12) United States Patent
Sugden

(10) Patent No.: US 6,260,667 B1
(45) Date of Patent: Jul. 17, 2001

(54) ROTOR CONTAINMENT BRAKE

(75) Inventor: Kenneth B. Sugden, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 09/292,373

(22) Filed: Apr. 15, 1999

(51) Int. Cl.[7] ............................. F16D 63/00; H02K 7/10
(52) U.S. Cl. ....................... 188/68; 188/31; 188/69; 310/77
(58) Field of Search ................... 188/31, 60, 68, 188/69, 156, 158, 189, 382, 187; 310/76, 77, 93

(56) References Cited

U.S. PATENT DOCUMENTS

| | | | |
|---|---|---|---|
| 3,080,031 | * 3/1963 | Young | 192/101 |
| 3,220,218 | * 11/1965 | Rio et al. | 464/33 |
| 3,620,045 | 11/1971 | Butterfield . | |
| 3,620,046 | * 11/1971 | Wenzel et al. | 464/33 |
| 4,095,681 | 6/1978 | David . | |
| 4,846,313 | 7/1989 | Sharp . | |
| 5,982,063 | * 11/1999 | Lutz et al. | 310/93 |

* cited by examiner

Primary Examiner—Robert J. Oberleitner
Assistant Examiner—Thomas J. Williams
(74) Attorney, Agent, or Firm—Antonelli, Terry, Stout & Kraus

(57) ABSTRACT

A generator and process for operating a generator in which, upon a bearing failure, a braking force is applied to the rotor shaft responsive to the bearing failure. Preferably, the rotor shaft at the anti-drive end is hollow and the brake is provided in the hollow of the rotor shaft. The rotor can include a plate member extending radially inwardly from the rotor shaft inside of the hollow at the anti-drive end towards the longitudinal axis, with the brake applying the braking force to the plate member. In a preferred aspect, the brake includes a cylindrical support operably connected to the housing and extending into the hollow in the anti-drive end of the rotor shaft, a carrier plate connected to the support and extending radially from the support towards the rotor shaft, a screw thread provided on the support, and a threaded plate mounted on the screw thread, the threaded plate extending radially from the support towards the rotor shaft and being spaced from the carrier plate. Rotation of the threaded plate about the support causes the threaded plate to move towards the carrier plate, pressing the plate member of the rotor between the carrier plate and the threaded plate, thereby applying braking force thereto.

6 Claims, 2 Drawing Sheets

ROTOR CONTAINMENT BRAKE

BACKGROUND OF THE INVENTION

The present invention relates to a generator including a rotor containment brake for applying a braking force to a rotor and to a process for operating the generator, including applying a braking force to the rotor upon bearing failure.

Generators for generating electricity in aircraft applications are generally operated at high speeds, e.g., in the range of 12,000 to 30,000 rpm. At such high operating speeds, a failure of the rotor bearings can cause catastrophic damage, e.g., by having parts thrown through the housing, thereby damaging other aircraft parts. It is known in the art to disconnect rotor shafts from the driving source, e.g., a gear box shaft, either through use of a shear section or by a non-shear type disconnect, the latter of which is disclosed in U.S. Pat. No. 3,620,045.

However, the disconnect systems known in the art do not operate instantaneously. That is, there is a delay between the occurrence of bearing failure and the disconnect. During the delay, there is a possibility the rotor parts will not be sufficiently contained within the generator housing. Accordingly, there is still a need to provide a mechanism for restricting prolonged rotor rotation immediately after bearing failure.

SUMMARY OF THE INVENTION

The present invention relates to a generator and process for operating a generator in which, upon a bearing failure, a braking force is applied to the rotor shaft responsive to the bearing failure. Preferably, the rotor shaft at the anti-drive end is hollow and the brake is provided in the hollow of the rotor shaft. The rotor can include a plate member extending radially inwardly from the rotor shaft inside of the hollow at the anti-drive end towards the longitudinal axis, with the brake applying the braking force to the plate member. In a preferred aspect, the brake includes a cylindrical support splined to the housing and extending into the hollow in the anti-drive end of the rotor shaft, a carrier plate fixedly connected to the support and extending radially from the support towards the rotor shaft, a screw thread provided on the support, and a threaded plate mounted on the screw thread, the threaded plate extending radially from the support towards the rotor shaft and being spaced from the carrier plate. Rotation of the threaded plate about the support causes the threaded plate to move towards the carrier plate, pressing the plate member of the rotor between the carrier plate and the threaded plate, thereby applying braking force thereto.

DETAILED DESCRIPTION OF THE PREFERRED EMBODIMENTS

Figure 1:
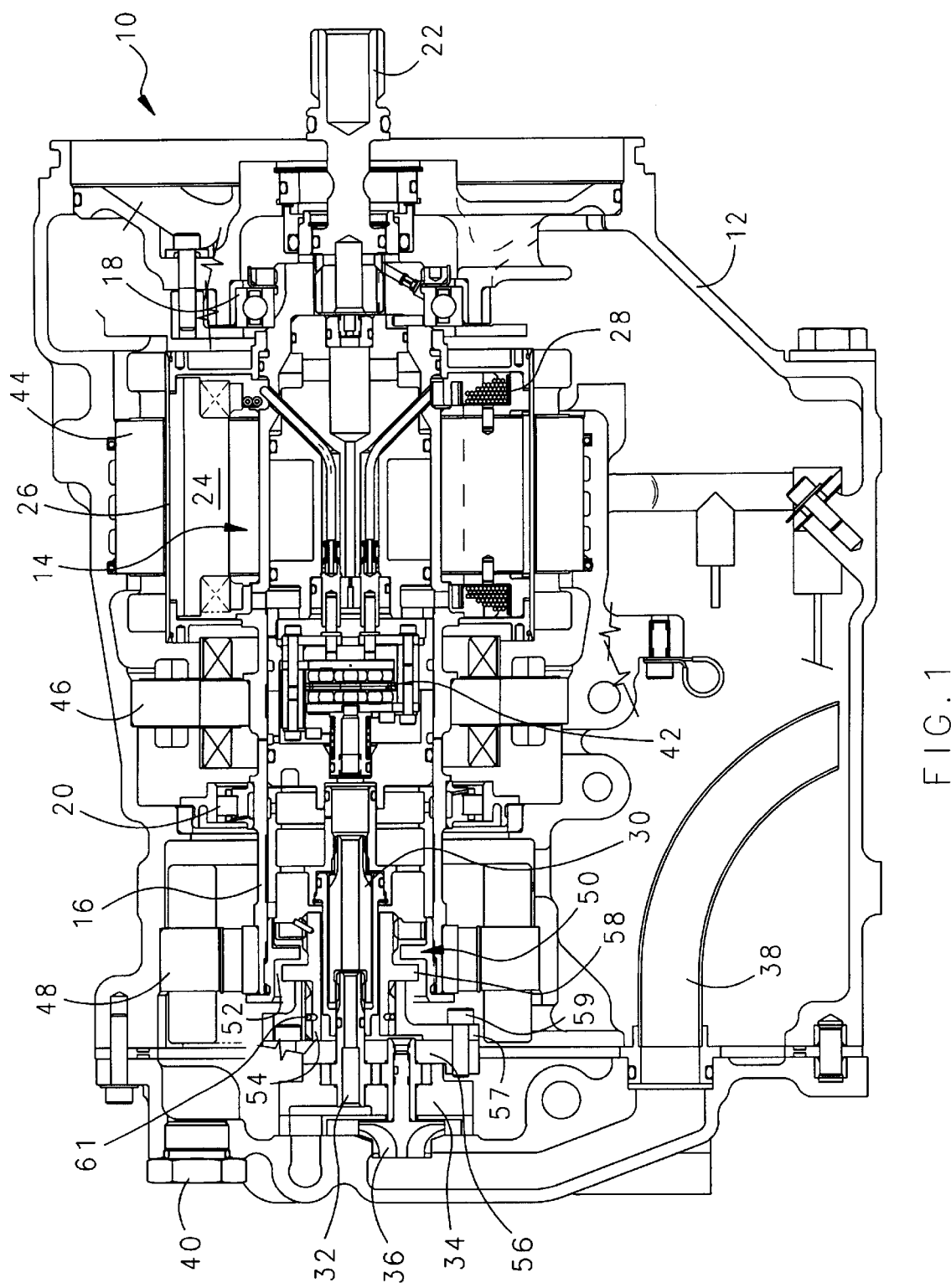
FIG. 1 is a cross-sectional view of a preferred embodiment of a generator including a rotor containment brake.

FIG. 1 shows the cross-sectional view of a generator 10. The generator 10 is, for example, a generator for supplying electricity to an aircraft. The generator shown in FIG. 1 is, e.g., of the type used as a back-up generator for a Boeing 777. The basic structure of such a generator is known in the art, with the generator 10 shown in FIG. 1 having been modified to provide a rotor containment brake according to the present invention.

The generator 10 includes a main housing 12 in which a rotor, generally designated by the reference numeral 14, is supported. The rotor 14 includes a rotor shaft 16 supported in the housing 12 by ball bearing 18 and roller bearing 20. The rotor shaft includes an input shaft 22 which is connected to a driving source, e.g., a gear box shaft from a reducing gear box from the engine. The rotor 14 includes a rotor core 24, a rotor sleeve 26 and main field windings 28. The anti-drive end of the rotor 14, i.e., the end opposite the input shaft 22, includes a pump drive section 30 connected to a pump gear set 32 for operating a supply pump 34 having pump impeller 36 connected to scavenge inlet 38. A vacuum brake valve 40 is also provided.

The rotor 14 is provided with a rectifier bridge 42, while the housing 12 is also provided with a main armature 44, an exciter stator 46 and a permanent magnet generator (PMG) armature 48. Such a generator can generate electricity for the electrical system of an aircraft as is known in the art.

The generator 10 has been modified to provide a rotor containment brake, generally designated by the reference numeral 50. The rotor containment brake is provided in a hollow 52 and the anti-drive end of the rotor shaft 16, e.g., adjacent the PMG armature.

Figure 2:
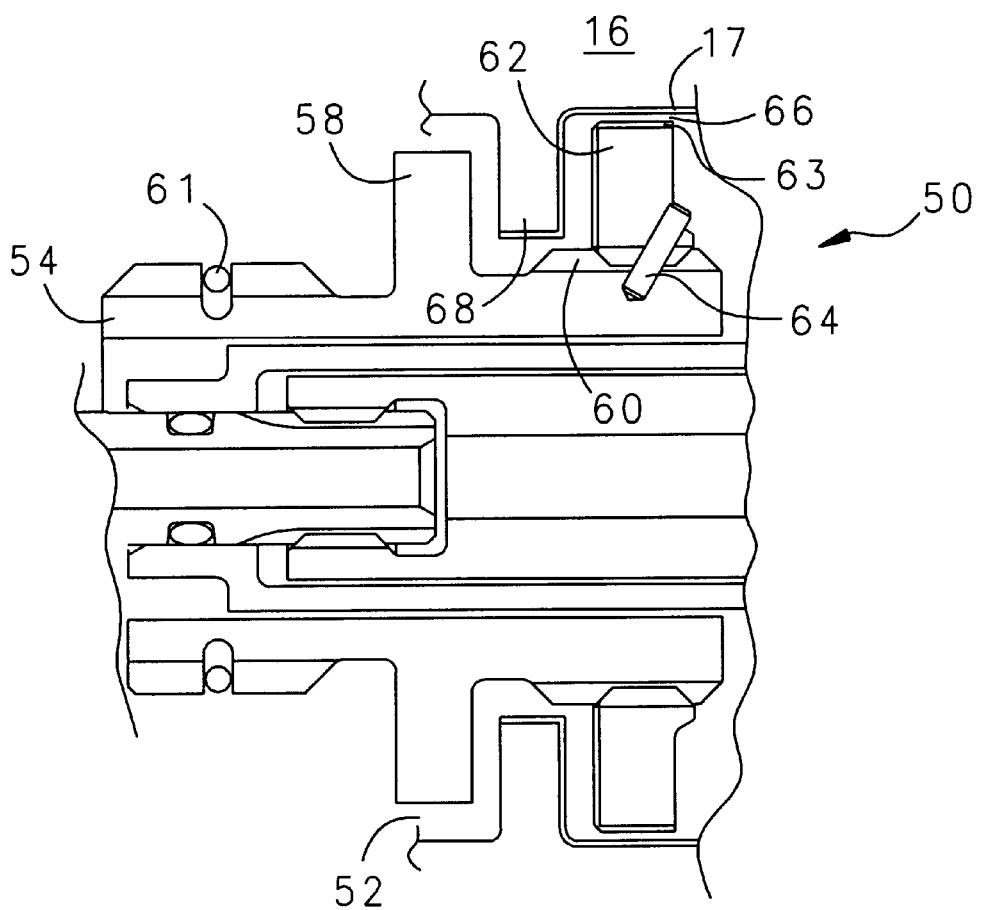
FIG. 2 is an enlarged cross-sectional view showing the rotor containment brake in more detail.

As can be seen generally in FIG. 1 and in more detail in FIG. 2, the rotor containment brake 50 includes a cylindrical support 54 which can be operably connected to a modified top pump plate 56. In the preferred embodiment shown in FIG. 1, the support 54 is mounted within an extension 57 which is attached to top pump plate 56 by, e.g., bolt 59. The support 54 is held within extension 57 during normal operation of the generator 10 by, e.g., a split ring retainer 61 mounted in slots in support 54. During braking, as will be apparent from the description hereinafter, the support 54 can move axially within the hollow 52.

A carrier plate 58 extends radially outwardly from the support 54 towards the rotor shaft 16. The carrier plate 58 can be integral with the support or mounted in any manner, but in this embodiment is prevented from rotating. Support 54 is provided with a screw thread 60. A threaded plate 62 is mounted on the support 54 and held in place during normal operation of the generator by, e.g., a shearing soft pin 64. The threaded plate could also be held on the support by a detent ring or the other means which will hold threaded plate 62 in position during normal operation but will be sheared upon bearing failure, as will be explained hereinafter.

During normal operation of the generator, i.e., while rotor shaft 16 rotates while being supported by bearings 18 and 20, a gap or clearance 66 is maintained between the rotor shaft 16 and the radially outer end of threaded plate 62. However, upon bearing failure, the clearance 66 closes, i.e., the inside diameter of rotor shaft 16 within hollow 52 hits against threaded plate 62. It is preferred that the portion of rotor 16 adjacent threaded plate 62 has a high friction surface 17 and/or that the radial outermost end of threaded plate 62 has a high friction surface 63. The high friction surface can be a grooved surface or can be a high friction material. When the rotating rotor shaft 16 hits the threaded plate 62 upon bearing failure, the rotating rotor shaft 16 creates torque to turn threaded plate 62, thereby shearing soft pin 64 and screwing threaded plate 62 towards carrier plate 58.

The rotor shaft 16 is provided with a plate member 68. The plate member 68 is fixed to the inside diameter of the rotor shaft 16 in hollow 52, e.g., by being integral to a removable splined nut part screwed into the rear of the rotor.

The plate member 68 can also be attached to rotor shaft 16 by a spring loaded or shear plug retained, guided diameter instead of a spline support. As threaded plate 62 is screwed along screw thread 60 towards carrier plate 58, the plate member 68 is grabbed between carrier plate 58 and threaded plate 62, thereby applying a braking force to rotor shaft 16. It is preferred that the mating surfaces of threaded plate 62 and plate member 68 also be provided with high friction surfaces 63 and 17, respectively, e.g., a grooved surface or a high friction material. When threaded plate 62 screws into contact with plate member 68, support 54 is pulled out of the position in which it was retained (during normal operation by split ring 61) towards plate member 68, pinching plate member 68 between threaded plate 62 and carrier plate 58.

In an alternative embodiment, the carrier plate 58 can be threaded in the opposite direction as threaded plate 62, so that, upon bearing failure, both plates 58, 62 are screwed towards plate member 68.

The rotor containment brake 50 herein described should have adequate strength to sustain rotor braking until the disconnect, e.g., shear section, disconnects the rotor shaft 16 from the gear box shaft. While the braking may cause damage, this condition is considered acceptable for accomplishing rotor containment since the real damage has already occurred prior to brake actuation.

While the invention has been described in terms of its preferred embodiments, it should be understood that numerous modifications may be made thereto without departing from the spirit and scope of the invention as defined in the appended claims. It is intended that all such modifications fall within the scope of the appended claims.

I claim:

1. A generator comprising:
   a housing;
   an armature provided in the housing;
   a rotor including a rotor shaft provided in the housing and supported by bearings for rotation about a longitudinal axis of the rotor shaft to generate electricity by rotation with respect to the armature; and
   a brake, responsive to a bearing failure, for applying a braking force to the rotor shaft;
   wherein the rotor shaft has a drive end operably connected to a gearbox shaft and an anti-drive end opposite thereto, wherein the rotor shaft at the anti-drive end is hollow and the brake is provided in the hollow of the rotor shaft.

2. A generator according to claim 1, wherein the rotor includes a plate member extending radially inwardly from the rotor shaft inside of the hollow at the anti-drive end towards the longitudinal axis, and the brake applies the braking force to the plate member.

3. A generator according to claim 2, wherein the brake comprises a cylindrical support operably connected to the housing and extending into the hollow in the anti-drive end of the rotor shaft, a carrier plate connected to the support and extending radially from the support towards the rotor shaft, a screw thread provided on the support, a threaded plate mounted on the screw thread, the threaded plate extending radially from the support towards the rotor shaft and being spaced from the carrier plate, whereby rotation of the threaded plate about the support causes the threaded plate to move towards the carrier plate, and wherein the brake is provided in the hollow in the anti-drive end of the rotor shaft such that the plate member of the rotor is provided between and spaced from the carrier plate and the threaded plate of the brake.

4. A generator according to claim 3, wherein an end of the threaded plate opposite the support and adjacent the inside of the rotor shaft is spaced from the rotor shaft by a gap while the rotor shaft is supported by the bearings, and is contacted by the rotor shaft due to eccentricity of rotation of the rotor shaft when there is a bearing failure, whereby contact of the rotating rotor shaft with the end of the threaded plate at bearing failure provides torque to rotate the threaded plate about the support causing the threaded plate to move towards the carrier plate and pressing the plate member of the rotor between the carrier plate and the threaded plate, thereby applying braking force thereto.

5. A generator according to claim 4, wherein the threaded plate is retained in position on the support by a soft pin which is sheared by the torque applied to the threaded plate by the rotor shaft upon contact at bearing failure.

6. A generator according to claim 4, wherein the threaded plate is retained in position on the support by a detent ring which is sheared by the torque applied to the threaded plate by the rotor shaft upon contact at bearing failure.

* * * * *